US009024498B2

(12) United States Patent
Murakami et al.

(10) Patent No.: US 9,024,498 B2
(45) Date of Patent: May 5, 2015

(54) ROTATING ELECTRICAL MACHINE (75) Inventors: Sohji Murakami, Kitakyushu (JP);
Haruki Yahara, Kitakyushu (JP);
Mitsunori Kamo, Kitakyushu (JP);
Motomichi Ohto, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 729 days.

(21) Appl. No.: 13/291,101

(22) Filed: Nov. 8, 2011

(65) Prior Publication Data
US 2012/0200189 A1     Aug. 9, 2012

(30) Foreign Application Priority Data
Feb. 8, 2011    (JP) .................................. 2011-024537

(51) Int. Cl.
H02K 21/12    (2006.01)
H02K 1/27    (2006.01)

(52) U.S. Cl.
CPC .................................... H02K 1/2773 (2013.01)

(58) Field of Classification Search
CPC ......................... H02K 1/2766; H02K 1/2773
USPC .............. 310/156.22, 156.43, 156.45, 156.47, 310/156.55, 156.57
See application file for complete search history.

(56) References Cited

U.S. PATENT DOCUMENTS

| | | | | |
|---|---|---|---|---|
| 5,939,810 | A | * | 8/1999 | Uchida et al. .......... 310/156.57 |
| 2002/0180294 | A1 | | 12/2002 | Kaneda et al. |
| 2002/0180295 | A1 | * | 12/2002 | Kaneda et al. .......... 310/156.43 |
| 2006/0255894 | A1 | | 11/2006 | Enomoto et al. |
| 2010/0171385 | A1 | | 7/2010 | Sakai et al. |

FOREIGN PATENT DOCUMENTS

| | | |
|---|---|---|
| CN | 1388623 | 1/2003 |
| CN | 101501967 | 8/2009 |
| CN | 1881754 B | 12/2010 |
| JP | 58-139665 | 8/1983 |
| JP | 01-144337 | 6/1989 |
| JP | 2008-086081 | 4/2008 |
| JP | 2010-088169 | 4/2010 |

OTHER PUBLICATIONS

Japanese Office Action for corresponding JP Application No. 2011-024537, Feb. 4, 2014.
Chinese Office Action for corresponding CN Application No. 201210011322.7, Dec. 19, 2013.
Chinese Office Action for corresponding CN Application No. 201210011322.7, Jun. 4, 2014.
Chinese Office Action for corresponding CN Application No. 201210011322.7, Jan. 20, 2015.

\* cited by examiner

*Primary Examiner* — Thanh Lam
(74) *Attorney, Agent, or Firm* — Mori & Ward, LLP (57) ABSTRACT

A rotating electrical machine includes a rotor core, a stator core, and at least one permanent magnet. The rotor core has an inner circumference portion and an outer circumference portion. The stator core is opposed to the outer circumference portion of the rotor core. The at least one permanent magnet radially extends inside the rotor core. The at least one permanent magnet has an incremental circumferential width in a direction from the inner circumference portion to the outer circumference portion of the rotor core.

18 Claims, 4 Drawing Sheets

ROTATING ELECTRICAL MACHINE

CROSS-REFERENCE TO RELATED APPLICATIONS

The present application claims priority under 35 U.S.C. §119 to Japanese Patent Application No. 2011-024537, filed Feb. 8, 2011. The contents of this application are incorporated herein by reference in their entirety.

BACKGROUND OF THE INVENTION

1. Field of the Invention

The present invention relates to a rotating electrical machine.

2. Discussion of the Background

Japanese Unexamined Patent Application Publication No. 1-144337 discloses a rotating electrical machine that includes permanent magnets radially extending inside a magnetic member (rotor core).

Specifically, Japanese Unexamined Patent Application Publication No. 1-144337 discloses a rotor structure of a permanent-magnet motor (rotating electrical machine) that includes magnets (permanent magnets) radially extending inside the magnetic member (rotor core). In the permanent-magnet motor, the magnets each have a rectangular cross-section having equal circumferential widths on the inner circumference side and the outer circumference side of the magnetic member.

In such permanent-magnet motor as disclosed in the JP1-144337 publication, in which the magnets radially extend inside the magnetic member, the magnets are believed to be magnetized in a direction orthogonal to the q axis of the permanent-magnet motor (orthogonal to the axis in a direction electrically orthogonal to the axis (d axis) along the direction of the main magnetic flux).

SUMMARY OF THE INVENTION

According to one aspect of the present invention, a rotating electrical machine includes a rotor core, a stator core, and at least one permanent magnet. The rotor core has an inner circumference portion and an outer circumference portion. The stator core is opposed to the outer circumference portion of the rotor core. The at least one permanent magnet radially extends inside the rotor core. The at least one permanent magnet has an incremental circumferential width in a direction from the inner circumference portion to the outer circumference portion of the rotor core.

According to another aspect of the present invention, a rotating electrical machine includes a rotor core, a stator core, and a plurality of permanent magnets. The rotor core has an inner circumference portion and an outer circumference portion. The stator core is opposed to the outer circumference portion of the rotor core. The plurality of permanent magnets radially extend inside the rotor core. The plurality of permanent magnets include pairs of circumferentially abutting permanent magnets inside the rotor core without intervention by the rotor core. Each of the plurality of permanent magnets is magnetized in a direction that is skewed by a predetermined angle θ relative to a direction orthogonal to a line defined by each of the circumferentially abutting pairs of permanent magnets. Each of the plurality of permanent magnets has an incremental circumferential width in a direction from the inner circumference portion to the outer circumference portion of the rotor core.

According to the other aspect of the present invention, a rotating electrical machine includes a rotor and a stator. The rotor serves as a rotating portion and has an inner circumference portion and an outer circumference portion. The rotor includes a rotor core and a plurality of permanent magnets. The permanent magnets are circumferentially disposed at predetermined spatial intervals in the rotor. The stator is adjacent the rotor across a space between the rotor and the stator. The stator serves as a secured portion. Among a plurality of magnetic poles that the plurality of permanent magnets cause on a surface of the rotor contacting the space, a predetermined magnetic pole is assumed a reference magnetic pole. A magnetic pole boundary line is assumed to connect a center of rotation of the rotor to a boundary between the reference magnetic pole and another one of the plurality of magnetic poles circumferentially adjacent the reference magnetic pole in the rotor. The plurality of permanent magnets are each magnetized in a direction not parallel to the magnetic pole boundary line. The plurality of permanent magnets each have an incremental circumferential width in a direction from the inner circumference portion to the outer circumference portion of the rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The embodiments will now be described with reference to the accompanying drawings, wherein like reference numerals designate corresponding or identical elements throughout the various drawings.

First, a motor 100 according to an embodiment will be described by referring to FIG. 1 to FIG. 4.

Figure 1:
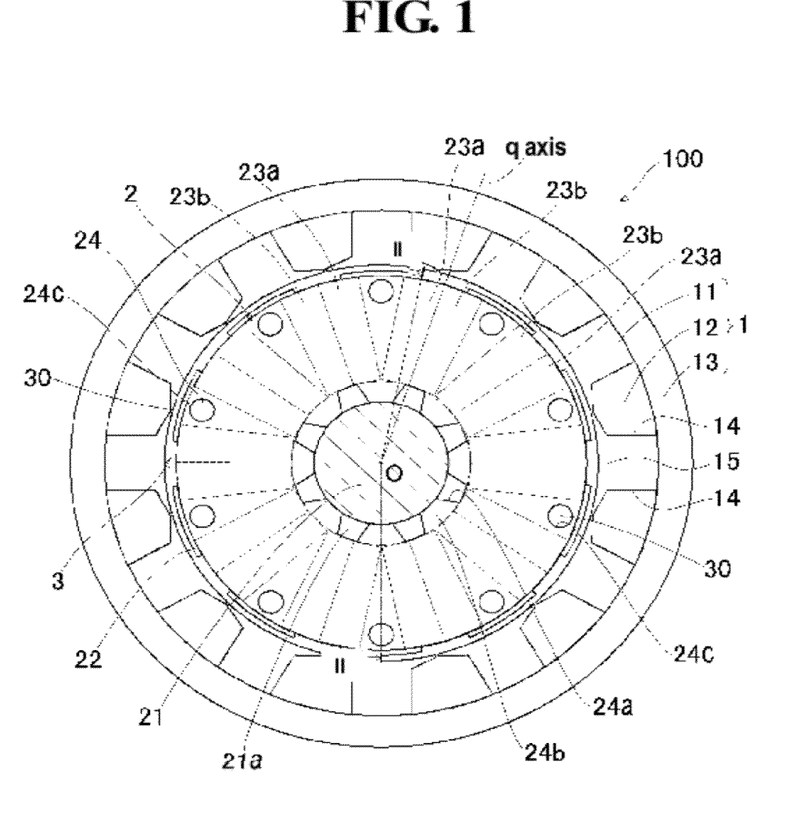
FIG. 1 is an axial elevational view of a rotor and a stator of a motor according to an embodiment.

As shown in FIG. 1, the motor 100 includes a stator 1 serving as a securing portion and a rotor 2 serving as a rotating portion. The motor 100 is an exemplary "rotating electrical machine" recited in the accompanying claims.

As shown in FIG. 1, the stator 1 includes a stator core 11, winding coils 12, and a stator yoke 13. The stator core 11 is opposed to the outer circumference portion of a rotor core 22, described later, of the rotor 2 across a predetermined space (gap 3). Inside the stator core 11, a plurality of (12 in this embodiment) slots 14 are formed. It is noted that the gap 3 is an exemplary "space" recited in the accompanying claims.

The plurality of the slots 14 are disposed at approximately equal angular intervals (approximately 30-degree intervals in this embodiment) in the rotation direction of the rotor 2 (hereinafter referred to as "circumference", "circumferential", or "circumferentially"). The winding coils 12 are accommodated in the respective plurality of the slots 14. The stator yoke 13 surrounds the outer circumference portion of the stator core 11. A portion of the stator core 11 between two adjacent slots 14 among the plurality of slots 14 constitutes a tooth 15.

Figure 2:
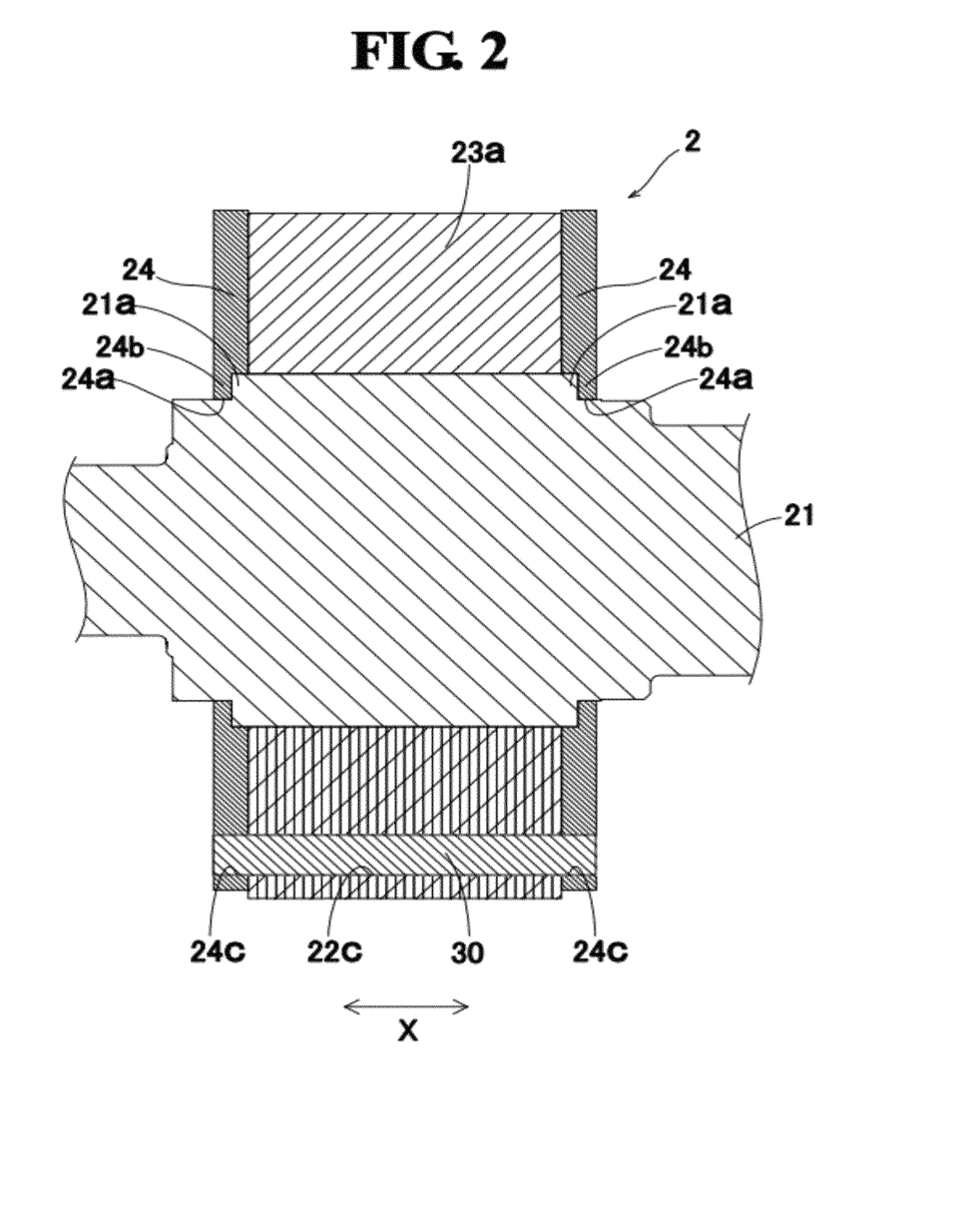
FIG. 2 is a cross-sectional view taken along the line II-II of FIG. 1.
Figure 3:
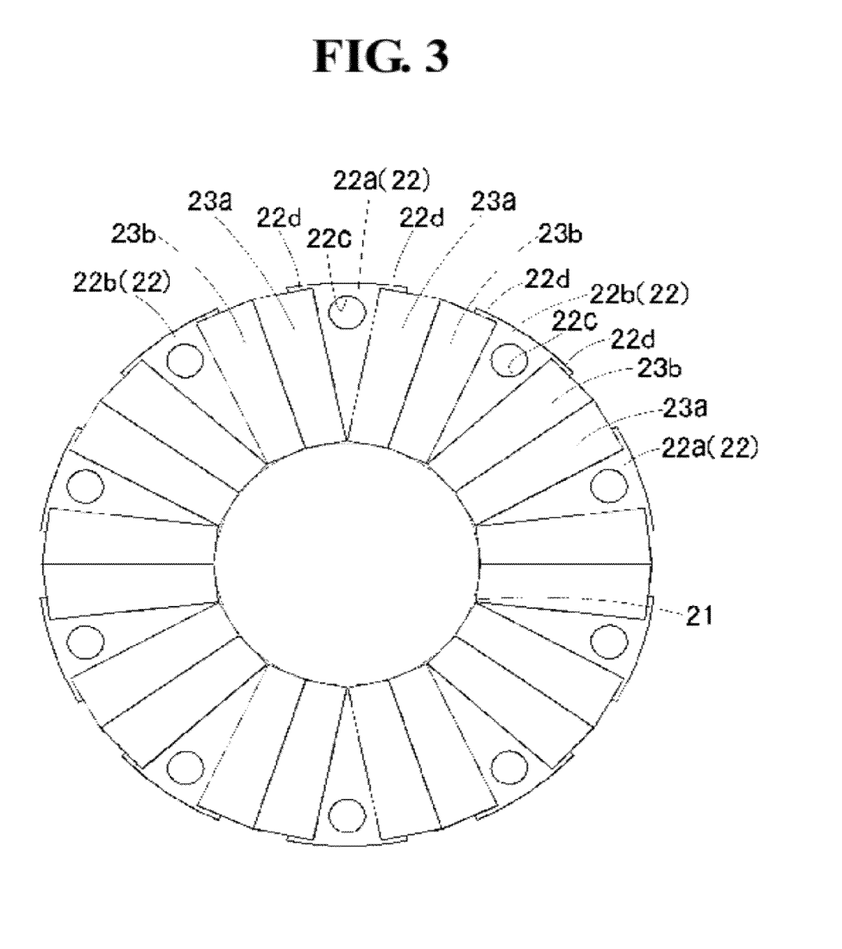
FIG. 3 is an elevational view of the rotor of the motor according to the embodiment, illustrating an arrangement of a plurality of core pieces and a plurality of permanent magnets constituting the rotor.

As shown in FIG. 1 to FIG. 3, the rotor 2 includes a shaft 21, the rotor core 22, a plurality of permanent magnets 23a and 23b, and plates 24. The shaft 21 extends in the X direction (see FIG. 2) through the center of the rotor 2. (The X direction will be hereinafter referred to as "axial" or "axially"). The rotor core 22 surrounds the shaft 21. The rotor core 22 is made up of a plurality of magnetic steel plates (see FIG. 2) that are axially disposed one atop of each other. The shaft 21 is an exemplary "rotating shaft" recited in the accompanying claims.

In this embodiment, as shown in FIG. 3, the rotor core 22 includes a plurality of (five in this embodiment) core pieces 22a serving as the N pole of the rotor core 22, and a plurality of (five in this embodiment) core pieces 22b serving as the S pole of the rotor core 22. The plurality of core pieces 22a and 22b are circumferentially disposed alternately at approximately equal angular intervals (approximately 36-degree intervals in this embodiment). The plurality of core pieces 22a and 22b each have a bar insertion hole 22c at a circumferential center portion adjacent the outer circumference portion. In the bar insertion hole 22c, a bar 30, described later, is to be inserted.

Also in this embodiment, the core pieces 22a and 22b each have magnet covers 22d at both circumferential end portions of the outer circumference portion. The magnet covers 22d cover portions of the outer circumference surfaces of the permanent magnets 23a and 23b adjacent the core pieces 22a and 22b. The portions of the outer circumference surfaces of the permanent magnets 23a and 23b are adjacent the core pieces 22a and 22b. The other portions of the outer circumference surfaces of the permanent magnets 23a and 23b not covered with the magnet covers 22d are exposed on the stator 1 side (see FIG. 1).

Figure 4:
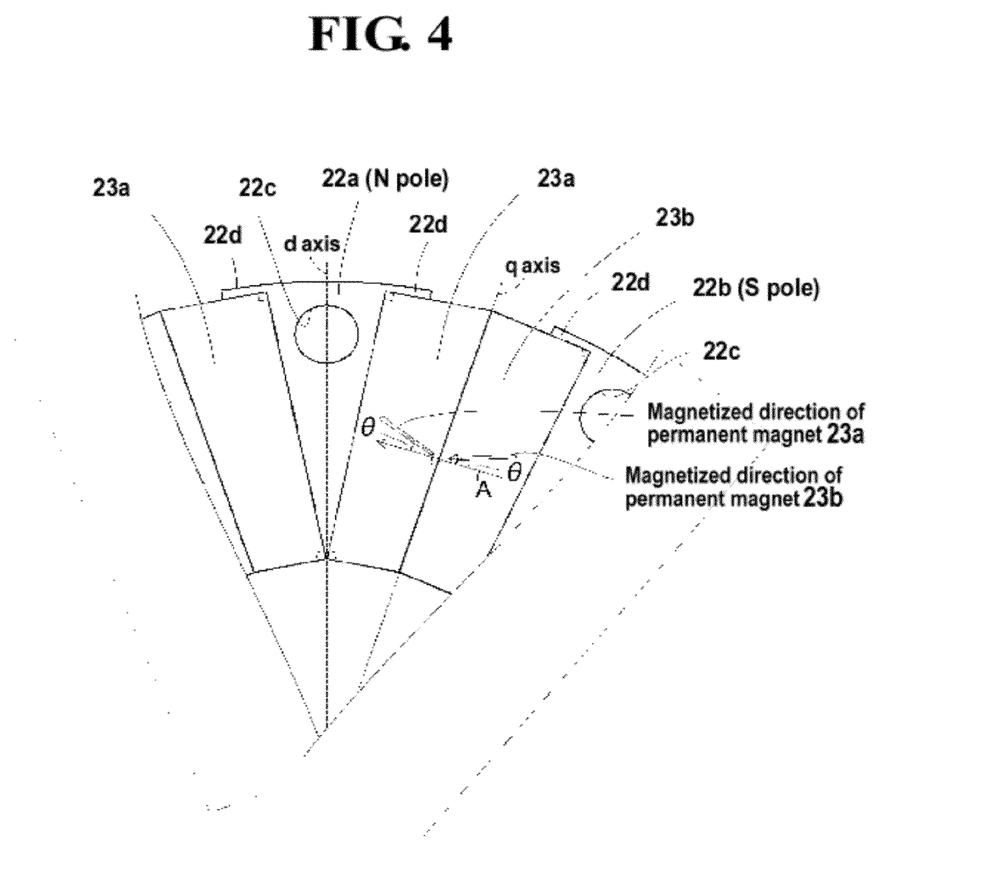
FIG. 4 is an enlarged view of permanent magnets of the motor according to the embodiment, illustrating a magnetized direction.

As shown in FIG. 1 to FIG. 4, the plurality of permanent magnets 23a and 23b radially extend inside the rotor core 22. Specifically, as shown in FIG. 3 and FIG. 4, the permanent magnets 23a and 23b are disposed between adjacent core pieces 22a and 22b among the plurality of core pieces 22a and 22b with the inner circumferential surfaces of the permanent magnets 23a and 23b contacting the outer circumference surface of the shaft 21. The permanent magnets 23a and 23b are disposed in pairs to circumferentially abut on one another without intervention by the core pieces 22a and 22b.

An adhesive layer, which is made of adhesive and not shown, is used to adhere the permanent magnet 23a (22b) to the core pieces 22a and 22b, the permanent magnet 23a to the permanent magnet 23b, and the permanent magnets 23a and 23b to the shaft 21. As shown in FIG. 2, the permanent magnets 23a and 23b extend axially between two plates 24, which hold the rotor core 22 from both axial sides as described later.

In this embodiment, as shown in FIG. 3 and FIG. 4, the plurality of permanent magnets 23a and 23b each have a trapezoidal cross-section, which has an incremental circumferential width in the direction from the inner circumference portion to the outer circumference portion of the rotor core 22 (the core pieces 22a and 22b). Specifically, as shown in FIG. 4, two corner portions of each of the permanent magnets 23a and 23b adjacent the core pieces 22a and 22b are at right angles.

In this embodiment, as shown in FIG. 4, the plurality of permanent magnets 23a and 23b are each magnetized in a direction that is skewed by a predetermined angle θ relative to the direction (the arrow A direction) orthogonal to the q axis of the motor 100 (which is an axis in the direction electrically orthogonal to the axis (d axis) in the direction along the main magnetic flux). Specifically, the permanent magnet 23a, which is adjacent the core piece 22a, is magnetized in a direction that is skewed toward the outer circumference side by a predetermined angle θ relative to the direction (the arrow A direction) orthogonal to the q axis. The permanent magnet 23b, which is circumferentially adjacent the core piece 22b, is magnetized in a direction that is skewed toward the inner circumference side by a predetermined angle θ relative to the direction (the arrow A direction) orthogonal to the q axis. That is, an approximate line-symmetry with respect to the q axis is ensured between the directions in which the circumferentially abutting permanent magnet 23a and permanent magnet 23b are magnetized between the core piece 22a and the core piece 22b.

As shown in FIG. 4, the q axis of the motor 100 according to this embodiment corresponds to the line of contact between the circumferentially abutting permanent magnet 23a and permanent magnet 23b. Additionally, when the core piece 22a shown in FIG. 4 is assumed a reference magnetic pole, the q axis of the motor 100 according to this embodiment corresponds to a line (magnetic pole boundary line) connecting the center of rotation O of the rotor 2 (see FIG. 1) to the boundary between the reference magnetic pole and another magnetic pole (the core pieces 22b shown in FIG. 4) circumferentially adjacent the reference magnetic pole.

In this embodiment, the predetermined angle θ is set at more than 0 degrees and equal to or more than 45 degrees. Setting the angle within this range increases the thickness of each of the permanent magnets 23a and 23b along the magnetized direction as compared with magnetizing the permanent magnets 23a and 23b in the direction (the arrow A direction (see FIG. 4)) orthogonal to the q axis. Hence, the operating point of the permanent magnets 23a and 23b increases. It is preferred that the predetermined angle θ be maintained within a constant range (more than 0 degrees and equal to or more than 45 degrees) when making variations in the number of magnetic poles of the motor 100 (the number of the core pieces 22a and 22b (10 in this embodiment)).

As shown in FIG. 2, the two plates 24 hold the rotor core 22 and the permanent magnets 23a and 23b from both axial sides. Specifically, the plates 24 are each in the form of a circular plate that radially extends while covering the axial end surfaces of the rotor core 22 and the permanent magnets 23a and 23b. As shown in FIG. 1, the diameter of each of the circular plates 24 is smaller than the outer diameter of the rotor core 22. The plates 24 are made of nonmagnetic material such as stainless.

In this embodiment, as shown in FIG. 1, the plates 24 each have an shaft insertion portion 24a, which is an opening, at the inner circumference portion (around the center portion of the circular plates 24). The shaft insertion portion 24a has toothed engagement portions 24b. Likewise, the shaft 21 has toothed engagement portions 21a (see FIG. 1) corresponding to the engagement portions 24b of the plates 24 on portions of the outer circumference surface of the shaft 21 axially protruding from the rotor core 22 (see FIG. 2). In this embodiment, the toothed engagement portions 24b of the plates 24 and the toothed engagement portions 21a of the shaft 21 are engaged (meshed) with each other, whereby the plates 24 and the shaft 21 are secured to each other. The engagement portions 21a are an exemplary "first engagement portion", while the engagement portions 24b are an exemplary "second engagement portion" recited in the accompanying claims.

In this embodiment, the plates 24 each have, adjacent to the outer circumference portion, a plurality of (10 in this embodiment) bar insertion holes 24c corresponding to the bar insertion holes 22c of the core pieces 22a and 22b. The plurality of bar insertion holes 24c are disposed adjacent to the outer circumference portion of each of the circular plates 24 in a circumferential manner at approximately equal angular intervals (approximately 36-degree intervals in this embodiment). As shown in FIG. 2, round (cylindrical) bars 30 axially extend through the bar insertion holes 24c of the plates 24 and through the bar insertion holes 22c of the core pieces 22a and 22b.

Next, referring to FIG. 1 to FIG. 3, description will be made with regard to a procedure for assembly of the rotor 2 of the motor 100 according to this embodiment.

First, as shown in FIG. 3, the plurality of core pieces 22a and the plurality of core pieces 22b are alternately disposed in the circumferential direction, thus forming the rotor core 22 on the outer circumference surface of the shaft 21 (see FIG. 1 and FIG. 2). Meanwhile, the plurality of radial permanent magnets 23a and 23b each having a trapezoidal cross-section are attached inside the rotor core 22. Specifically, the permanent magnets 23a and 23b are attached inside the rotor core 22 with the inner circumference surfaces of the permanent magnets 23a and 23b contacting the outer circumference surface of the shaft 21 and with the permanent magnets 23a and 23b circumferentially abutting on one another between adjacent core pieces 22a and 22b. Meanwhile, the permanent magnets 23a (22b) are adhered to the core pieces 22a and 22b, the permanent magnet 23a is adhered to the permanent magnet 23b, and the permanent magnets 23a and 23b are adhered to the shaft 21 with an adhesive.

Next, the shaft 21 with the rotor core and the permanent magnets 23a and 23b is attached with the two circular plates 24 from both axial sides. Specifically, the shaft 21 is first inserted through the shaft insertion portions 24a, which are at the inner circumference portions of the plates 24. Then, as shown in FIG. 1, the toothed engagement portions 21a on the outer circumference portion of the shaft 21 are engaged with the toothed engagement portions 24b on the shaft insertion portions 24a of the plates 24, thus securing the shaft 21 and the plates 24 to each other. Meanwhile, the bar insertion holes 24c of the plates 24 are aligned with the bar insertion holes 22c of the core pieces 22a and 22b.

Then, as shown in FIG. 2, the bars 30 are axially inserted through the bar insertion holes 24c of the plates 24 aligned with the bar insertion holes 22c of the core pieces 22a and 22b, thus securing the plates 24 and the core pieces 22a and 22b to each other. Thus, the rotor 2 of the motor 100 according to this embodiment is assembled.

Thus, in this embodiment, the permanent magnets 23a and 23b each have an incremental circumferential width in the direction from the inner circumference portion and the outer circumference portion of the rotor core 22. This increases the circumferential width of the end portion of each of the permanent magnets 23a and 23b on the outer circumference side of the rotor core 22. This in turn increases the thickness, along the magnetized direction (which is a direction across the q axis of the motor 100), of the end portion of each of the permanent magnets 23a and 23b on the outer circumference side of the rotor core 22, which is susceptible to a flux caused by a magnetic armature reaction. Hence, the operating point of the permanent magnets 23a and 23b increases. This minimizes irreversible demagnetization on the end portion of each of the permanent magnets 23a and 23b on the outer circumference side of the rotor core 22, which is susceptible to a flux caused by a magnet armature reaction. At the same time, the circumferential width of each of the permanent magnets 23a and 23b is decreased on the other end portion thereof on the inner circumference side of the rotor core 22. Hence, the permanent magnets 23a and 23b attachable inside the rotor core 22 (attachable to the inner circumference portion of the rotor core) increase by a number equivalent to the amount of decrease of the circumferential widths of the permanent magnets 23a and 23b on the inner circumference side. This increases the output of the motor 100. Consequently, the output of the motor 100 increases while irreversible demagnetization of the permanent magnets 23a and 23b is minimized.

Also in this embodiment, as described above, the permanent magnets 23a and 23b each have a trapezoidal cross-section having an incremental circumferential width in the direction from the inner circumference portion to the outer circumference portion of the rotor core 22. This facilitates production of permanent magnets 23a and 23b each having an incremental circumferential width in the direction from the inner circumference portion to the outer circumference portion of the rotor core 22.

Also in this embodiment, as described above, the permanent magnets 23a and 23b are magnetized in a direction that is skewed by a predetermined angle $\theta$ relative to the direction orthogonal to the q axis. This increases the thickness of each of the permanent magnets 23a and 23b along the magnetized direction as compared with magnetizing the permanent magnets 23a and 23b in the direction (the arrow A direction (see FIG. 4)) orthogonal to the q axis. Hence, the operating point of the permanent magnets 23a and 23b increases. This, as a result, more securely minimizes irreversible demagnetization of the permanent magnets 23a and 23b. Making the magnetized directions of the permanent magnets 23a and 23b askew relative to the direction (the arrow A direction) orthogonal to the q axis ensures smoothness in the change of the magnetic flux flowing through the gap 3 between the rotor core 22 and the stator core 11 associated with the rotation of the rotor core 22. This results in reduced cogging torque in the motor 100.

Also in this embodiment, as described above, the predetermined angle $\theta$ is set at more than 0 degrees and equal to or more than 45 degrees. Setting the predetermined angle $\theta$ within this angle range facilitates the attempt to increase the thickness of each of the permanent magnets 23a and 23b along the magnetized direction. Setting the predetermined angle $\theta$ within the angle range also ensures smoothness in the change of the magnetic flux flowing through the gap 3 between the rotor core 22 and the stator core 11 associated with the rotation of the rotor core 22.

Also in this embodiment, as described above, the shaft 21 is attached to the inner circumference portion of the rotor core 22. Also as described above, the rotor core 22 includes the plurality of core pieces 22a and 22b disposed circumferentially at predetermined spatial intervals with the permanent magnets 23a and 23b disposed between adjacent core pieces 22a and 22b among the plurality of core pieces 22a and 22b and with the inner circumferential surfaces of the permanent magnets 23a and 23b contacting the outer circumference surface of the shaft 21. This turns the rotor core 22 into the plurality of core pieces 22a and 22b circumferentially separated from each other, that is, circumferentially disposed at predetermined spatial intervals. As opposed to the case where the core piece 22a is connected to the core piece 22b along the outer circumference of the rotor core 22 and where the outer circumference surfaces of the permanent magnets 23a and 23b are covered with the rotor core 22 (the core pieces 22a and 22b), the separate arrangement inhibits the magnetic flux of the permanent magnets 23a and 23b from partially flowing away from the stator core 11 side and circulating through the rotor core 22 over the outer circumference surfaces of the permanent magnets 23a and 23b. This results in reduced leakage flux and in further increased output of the motor 100.

Also in this embodiment, as described above, the core pieces 22a and 22b each have magnet covers 22d at the outer circumference portion to cover portions of the outer circumference surfaces of the permanent magnets 23a and 23b adjacent the core pieces 22a and 22b. The portions of the outer circumference surfaces of the permanent magnets 23a and 23b are adjacent the core pieces 22a and 22b. Additionally, the permanent magnets 23a and 23b are disposed between adjacent core pieces 22a and 22b among the plurality of core pieces 22a and 22b with the inner circumference surfaces of the permanent magnets 23a and 23b contacting the outer circumference surface of the shaft 21 while exposing the other portions of the outer circumference surfaces of the permanent magnets 23a and 23b not covered with the magnet covers 22d. Providing the magnet covers 22d inhibits the permanent magnets 23a and 23b from being centrifugally displaced to the outer circumference side by the rotation of the rotor core 22 (the core pieces 22a and 22b).

With the magnet covers 22d covering portions of the outer circumference surfaces of the permanent magnets 23a and 23b adjacent the core pieces 22a and 22b, an increased area is ensured over the outer circumference surface of the rotor core 22 to generate the magnetic flux intended to flow to the stator core 11 side. This ensures smoothness in the change of the magnetic flux flowing through the gap 3 between the rotor core 22 (the core pieces 22a and 22b) and the stator core 11 associated with the rotation of the core 22 (the core pieces 22a and 22b). This results in further reduced cogging torque in the motor 100. Exposing the other portions of the outer circumference surfaces of the permanent magnets 23a and 23b not covered with the magnet covers 22d reduces leakage flux as compared with using a magnetic material or other material to cover the other portions of the outer circumference surfaces of the permanent magnets 23a and 23b not covered with the magnet covers 22d. This results in further increased output of the motor 100.

Also in this embodiment, as described above, two permanent magnets 23a and 23b circumferentially abut on one another between adjacent two core pieces 22a and 22b among the plurality of core pieces 22a and 22b without intervention by the core pieces 22a and 22b. This reduces the total distance of the space in the magnetic circuit formed by the permanent magnet 23a and the permanent magnet 23b, as opposed to the case where the permanent magnets 23a and 23b are adjacent to one another with intervention by the core piece 22a or 22b. Hence, the operating point of the permanent magnets 23a and 23b increases. This results in further increased output of the motor 100.

Also in this embodiment, as described above, the shaft 21 is attached to the inner circumference portion of the rotor core 22, and the plates 24 cover the axial end surfaces of the rotor core 22, which is made up of a plurality of magnetic steel plates. The shaft 21 has the engagement portions 21a on the outer circumference portion, while the plates 24 each have the engagement portions 24b at the inner circumference portion for engagement with the engagement portions 21a of the shaft 21. The engagement between the engagement portions 21a of the shaft 21 and the engagement portions 24b of the plates 24 firmly secures the shaft 21 and the plates 24 to each other.

While in this embodiment the permanent magnets each have a trapezoidal cross-section having an incremental circumferential width in the direction from the inner circumference portion to the outer circumference portion of the rotor core, this should not be construed in a limiting sense. The permanent magnets may have other cross-sections than trapezoidal cross-sections (examples including, but not limited to, a fan-shaped cross-section having an incremental circumferential width in the direction from the inner circumference portion to the outer circumference portion of the rotor core).

While in this embodiment the permanent magnets are magnetized in a direction skewed relative to the direction orthogonal to the q axis of the rotating electrical machine, this should not be construed in a limiting sense. The permanent magnets may be magnetized in the direction orthogonal to the q axis of the rotating electrical machine.

While in this embodiment the rotor core includes a plurality of core pieces, this should not be construed in a limiting sense. The rotor core may be a single entity.

While in this embodiment two permanent magnets are disposed between adjacent two core pieces among a plurality of core pieces, this should not be construed in a limiting sense. It is also possible to provide a single permanent magnet or three or more permanent magnets between adjacent two core pieces, insofar as the circumferential width is incremental in the direction from the inner circumference portion to the outer circumference portion of the rotor core.

While in this embodiment the core pieces each have magnet covers to cover portions of the outer circumference surfaces of the permanent magnets adjacent the core pieces, this should not be construed in a limiting sense. The core pieces may not necessarily have magnet covers.

While in this embodiment the engagement portions 21a on the outer circumference portion of the shaft 21 are toothed and the engagement portions 24b at the inner circumference portion of the plates 24 are toothed, this should not be construed in a limiting sense. The engagement portions 21a and the engagement portions 24b may be in any other form than toothed shapes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A rotating electrical machine comprising:
   a rotor core having an inner circumference portion and an outer circumference portion;
   a stator core opposed to the outer circumference portion of the rotor core; and
   permanent magnets radially extending inside the rotor core, the permanent magnets each having an incremental circumferential width in a direction from the inner circumference portion to the outer circumference portion of the rotor core,
   wherein the rotating electrical machine has a q axis, and
   wherein all of the permanent magnets are magnetized in magnetization directions across the q axis such that the magnetization directions are skewed relative to a direction orthogonal to the q axis, the magnetization directions of all of the permanent magnets being more than 0 degrees and less than or equal to 45 degrees relative to the direction orthogonal to the q axis.

2. The rotating electrical machine according to claim 1, wherein at least one permanent magnet of the permanent magnets has a trapezoidal cross-section having an incremental circumferential width in the direction from the inner circumference portion to the outer circumference portion of the rotor core.

3. The rotating electrical machine according to claim 1, further comprising a rotating shaft at the inner circumference portion of the rotor core,
    wherein the rotor core comprises a plurality of core pieces disposed at predetermined spatial intervals in a circumferential direction and each having an outer circumference portion, and
    wherein at least one permanent magnet of the permanent magnets is disposed between adjacent core pieces among the plurality of core pieces and has an inner circumferential surface contacting an outer circumference surface of the rotating shaft.

4. The rotating electrical machine according to claim 3,
    wherein the adjacent core pieces each comprise at least one magnet cover on the outer circumference portion of each of the adjacent core pieces, the at least one magnet cover covering a portion of an outer circumference surface of the at least one permanent magnet between the adjacent core pieces, the portion of the outer circumference surface of the at least one permanent magnet being adjacent one of the adjacent core pieces, and
    wherein the at least one permanent magnet is disposed between the adjacent core pieces and has the inner circumferential surface contacting the outer circumference surface of the rotating shaft while exposing another portion of the outer circumference surface not covered with the at least one magnet cover.

5. The rotating electrical machine according to claim 3, wherein the at least one permanent magnet comprises two permanent magnets between the adjacent core pieces, the two permanent magnets being circumferentially adjacent to one another without intervention by the adjacent core pieces.

6. The rotating electrical machine according to claim 1,
    wherein the rotor core comprises a plurality of magnetic steel plates axially disposed one atop of each other, and
    wherein the rotating electrical machine further comprises:
        a rotating shaft at the inner circumference portion of the rotor core and having an outer circumference portion, the rotating shaft comprising a first engagement portion on the outer circumference portion; and
        a plate surrounding the rotating shaft and covering an axial surface of the rotor core, the plate having an inner circumference portion and comprising a second engagement portion on the inner circumference portion, the second engagement portion being configured to be engaged with the first engagement portion of the rotating shaft.

7. A rotating electrical machine comprising:
    a rotor core having an inner circumference portion and an outer circumference portion;
    a stator core opposed to the outer circumference portion of the rotor core; and
    permanent magnets radially extending inside the rotor core, the permanent magnets comprising pairs of circumferentially abutting permanent magnets inside the rotor core without intervention by the rotor core,
    wherein all of the permanent magnets are magnetized in magnetization directions that are skewed relative to a direction orthogonal to a line defined by each of the circumferentially abutting pairs of permanent magnets, the magnetization directions of all of the permanent magnets being more than 0 degrees and less than or equal to 45 degrees relative to the direction orthogonal to the line, and
    wherein each of the permanent magnets have an incremental circumferential width in a direction from the inner circumference portion to the outer circumference portion of the rotor core.

8. A rotating electrical machine comprising:
    a rotor serving as a rotating portion and having an inner circumference portion and an outer circumference portion, the rotor comprising:
        a rotor core; and
        permanent magnets circumferentially disposed at predetermined spatial intervals in the rotor; and
    a stator adjacent the rotor across a space between the rotor and the stator, the stator serving as a secured portion,
    wherein among a plurality of magnetic poles that the permanent magnets cause on a surface of the rotor contacting the space, a predetermined magnetic pole is assumed a reference magnetic pole,
    wherein a magnetic pole boundary line is assumed to connect a center of rotation of the rotor to a boundary between the reference magnetic pole and another one of the plurality of magnetic poles circumferentially adjacent the reference magnetic pole in the rotor,
    wherein all of the permanent magnets are magnetized in magnetization directions that are skewed relative to a direction orthogonal to the magnetic pole boundary line, the magnetization directions of all of the permanent magnets being more than 0 degrees and less than or equal to 45 degrees relative to the direction orthogonal to the magnetic pole boundary line, and
    wherein the permanent magnets each have an incremental circumferential width in a direction from the inner circumference portion to the outer circumference portion of the rotor.

9. The rotating electrical machine according to claim 2, further comprising a rotating shaft at the inner circumference portion of the rotor core,
    wherein the rotor core comprises a plurality of core pieces disposed at predetermined spatial intervals in a circumferential direction and each having an outer circumference portion, and
    wherein the at least one permanent magnet is disposed between adjacent core pieces among the plurality of core pieces and has an inner circumferential surface contacting an outer circumference surface of the rotating shaft.

10. The rotating electrical machine according to claim 1, wherein at least one permanent magnet of the permanent magnets is skewed toward an outer circumference side of the rotating electrical machine relative to the direction orthogonal to the q axis.

11. The rotating electrical machine according to claim 1, wherein at least one permanent magnet of the permanent magnets is skewed toward an inner circumference side of the rotating electrical machine relative to the direction orthogonal to the q axis.

12. The rotating electrical machine according to claim 1,
    wherein at least one permanent magnet of the permanent magnets is skewed toward an outer circumference side of the rotating electrical machine relative to the direction orthogonal to the q axis, and
    wherein at least one other permanent magnet of the permanent magnets is skewed toward an inner circumference side of the rotating electrical machine relative to the direction orthogonal to the q axis.

13. The rotating electrical machine according to claim 7, wherein at least one permanent magnet of the permanent magnets is skewed toward an outer circumference side of the rotating electrical machine relative to the direction orthogonal to the line.

14. The rotating electrical machine according to claim 7, wherein at least one permanent magnet of the permanent magnets is skewed toward an inner circumference side of the rotating electrical machine relative to the direction orthogonal to the line.

15. The rotating electrical machine according to claim 7,
wherein at least one permanent magnet of the permanent magnets is skewed toward an outer circumference side of the rotating electrical machine relative to the direction orthogonal to the line, and
wherein at least one other permanent magnet of the permanent magnets is skewed toward an inner circumference side of the rotating electrical machine relative to the direction orthogonal to the line.

16. The rotating electrical machine according to claim 8, wherein at least one permanent magnet of the permanent magnets is skewed toward an outer circumference side of the rotating electrical machine relative to the direction orthogonal to the magnetic pole boundary line.

17. The rotating electrical machine according to claim 8, wherein at least one permanent magnet of the permanent magnets is skewed toward an inner circumference side of the rotating electrical machine relative to the direction orthogonal to the magnetic pole boundary line.

18. The rotating electrical machine according to claim 8,
wherein at least one permanent magnet of the permanent magnets is skewed toward an outer circumference side of the rotating electrical machine relative to the direction orthogonal to the magnetic pole boundary line, and
wherein at least one other permanent magnet of the permanent magnets is skewed toward an inner circumference side of the rotating electrical machine relative to the direction orthogonal to the magnetic pole boundary line.

\* \* \* \* \*